United States Patent [19]

Garrigue et al.

[11] Patent Number: 4,962,182

[45] Date of Patent: Oct. 9, 1990

[54] PROCESS FOR CURING AMINOPLASTIC RESINS

[75] Inventors: Roger Garrigue; Jack Lalo, both of Toulouse, France

[73] Assignee: Norsolor (Orkem Group), Paris La Defense, France

[21] Appl. No.: 289,272

[22] Filed: Dec. 23, 1988

[30] Foreign Application Priority Data

Dec. 23, 1987 [FR] France .................. 87 18003

[51] Int. Cl.$^5$ ............................ C08G 12/12
[52] U.S. Cl. ........................ 528/230; 524/405; 524/597; 525/509; 528/259; 528/260
[58] Field of Search ............. 524/14, 1, 597; 528/230, 26; 525/266

[56] References Cited

U.S. PATENT DOCUMENTS

| | | | |
|---|---|---|---|
| 2,193,630 | 3/1940 | Howald | 528/259 |
| 4,482,699 | 11/1984 | Williams | 528/260 |
| 4,510,278 | 4/1985 | Hoetjer | 524/14 |
| 4,814,422 | 3/1989 | Diem et al. | 528/256 |

FOREIGN PATENT DOCUMENTS

| | | | |
|---|---|---|---|
| 0152633 | 2/1950 | Australia | 524/15 |
| 0062389 | 10/1982 | European Pat. Off. | |
| 2084597 | 4/1982 | United Kingdom | |
| 2099007 | 12/1982 | United Kingdom | |

OTHER PUBLICATIONS

192998s, "New urea-formaldehyde resin of low toxicity", Pukhovitskaya, A. N.; Chemical Abstracts, vol. 94, 1981, p. 22.

88601a, "Manifestation of triazinone ring formation during curing of urea-formaldehyde resins in solid-state high-resolution carbon-13 NMR spectra"; Slonim, I. Ya; Chemical Abstracts, vol. 103, 1985, p. 88603.

*Primary Examiner*—John Kight, III
*Assistant Examiner*—P. Hampton-Hightower
*Attorney, Agent, or Firm*—Millen, White & Zelano

[57] ABSTRACT

Curing aminoplastic resins containing urea and melamine by adding as the curing catalyst, a triazinone derivative.

12 Claims, No Drawings

PROCESS FOR CURING AMINOPLASTIC RESINS

BACKGROUND OF THE INVENTION

The present invention relates to a new process for curing aminoplastic resins; its subject matter is more particularly a new process for curing aminoplastic resins using a catalytic system making it possible to influence the reactivity of the aminoplastic resins.

Aminoplastic resins are known products which are widely employed in the woodworking industry, particularly for the manufacture of particle boards. The aminoplastic resins most commonly employed are urea-formaldehyde resins. They are manufactured in a known manner by condensation of urea and of formaldehyde at a pH of between 4 and 7 and at a temperature close to boiling point: this condensation reaction is preferably carried out in several stages.

The chief disadvantage of urea-formaldehyde resins is that they cause large quantities of free formaldehyde to be given off. Attempts have been made to reduce the free formaldehyde content by using various methods of manufacture; unfortunately, when the aim is to attain particularly low formaldehyde contents, experience shows that this objective is accompanied both by a decrease in the reactivity and the stability of the resins and by a deterioration in the mechanical properties of the finished boards. In order to get rid of free formaldehyde, it has also been proposed to employ resins devoid of formaldehyde, in particular resins based on isocyanate solutions. Unfortunately, the problem of formaldehyde is replaced by that of the isocyanates, whose action on man is more harmful and more durable than that of formaldehyde, since the presence of free isocyanate groups has been demonstrated in particle boards even several years after manufacture.

It has also been proposed to add melamine during the manufacture of the urea-formaldehyde resins. Unfortunately, the use of melamine with conventional urea-formaldehyde resins begins to be effective only starting at levels which may reach 20% and more, and this makes its use commercially prohibitive, given its cost. It has thus been proposed to lower the melamine content to values below 10%. A decrease in the reactivity of these resins is then observed, and this is particularly detrimental to maintaining commercially acceptable rates of manufacture.

There is therefore a need to have available urea-formaldehyde resins containing melamine, but which exhibit both good reactivity, good stability and reduced formaldehyde contents and whose use results in final particle boards exhibiting good mechanical characteristics.

SUMMARY OF THE INVENTION

The present invention relates to a new process for curing aminoplastic resins consisting of ureaformaldehyde resins containing less than 10% of melamine and having an $F/NH_2$ molar ratio of less than 0.5, cured with the aid of a catalyst consisting of an ammonium salt, characterized in that the curing of the aminoplastic resins is carried out with the aid of a catalyst consisting of a triazinone derivative of formula:

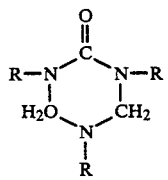

in which R is H and/or $CH_2OH$, this catalyst being employed in a proportion of 0.01 to 0.2 moles per 100 grams of dry resin.

According to an important characteristic of the process of the invention, the catalyst employed, consisting of a triazinone derivative, may be obtained according to various methods, for example:

reaction of urea and of formaldehyde or of a ureaformaldehyde precondensate with an ammonium salt, these reactants being employed in the following molar ratios:

formaldehyde/urea equal to at least 5 and formaldehyde/$(NH_4)^+$ equal to at least 1, the salt being chosen from a chloride, an acetate, a lactate, a formate or a phosphate, or by reaction of hexamethylenetetramine with urea and with formaldehyde in the presence of an acid, the reactants being preferably employed in stoichiometric quantities, or by reaction of ammonia with urea and formaldehyde in the presence of an acid, the reactants being preferably employed in stoichiometric quantity, the quantity of acid present being preferably one mole per mole of ammonia.

According to the invention, when the catalyst employed is manufactured from hexamethylenetetramine or from ammonia in the presence of an acid, this acid is chosen from hydrochloric, acetic, lactic, formic or phosphoric acid.

It has been found that operation under these conditions produces adhesive mixtures based on ureaformaldehyde resin containing melamine which are particularly reactive and that these resins permit the manufacture of particle boards exhibiting reduced rates of release of free formaldehyde, which are combined with good mechanical characteristics. Furthermore, the use of such catalytic compositions thus makes it possible to adjust the $F/NH_2$ molar ratio of the aminoplastic resins employed, whatever the melamine content.

The process of the present application consists in performing the curing of urea-formaldehyde resins with a $F/NH_2$ molar ratio $<0.5$, the $NH_2$ groups being the sum total of the $NH_2$ groups of urea and of melamine used and containing less than 10% of melamine with the aid of a catalyst having the formula:

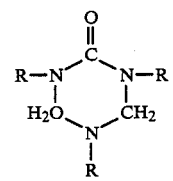

in which R is H and/or $CH_2OH$, this catalyst being employed in a proportion of 0.01 to 2 moles per 100 grams of dry resin.

According to the invention, the catalyst used may be obtained according to various processes:

either by reaction of urea and of formaldehyde or of a urea-formaldehyde precondensate with an ammonium salt, these reactants being employed in molar ratios:

formaldehyde/urea equal to at least 5, and formaldehyde/$(NH_4)^+$ equal to at least 1 the ammonium salt employed being chosen from ammonium chloride, acetate, lactate, formate or phosphate, or by reaction of hexamethylenetetramine with urea and with formaldehyde in the presence of an acid chosen from hydrochloric, acetic, lactic, formic or phosphoric acid, the reaction taking place according to the following scheme:

Hexamethylenetetramine+acid+formaldehyde+urea→triazinone derivative or by reaction of ammonia with urea and formaldehyde in the presence of an acid, the reactants being preferably employed in stoichiometric quantity, the quantity of acid present being preferably one mole per mole of ammonia.

Urea-formaldehyde resins with a molar ratio $F/NH_2 < 0.5$ containing less than 10% of melamine employed for implementing the process of the invention are known resins. They are described, for example, in a concurrently filed United States commonly owned application entitled "New process for the manufacture of aminoplastic resins having very low formaldehyde emission rates" by M. B. Druet and M. D. Hopin (4), said application being incorporated herein. They are manufactured in particular according to a three-stage process which consists in:

in a first stage, condensing urea and formaldehyde in solution in such quantity that the $F/NH_2$ ratio in this stage is between 0.9 and 1.05; in a second stage, adding urea and melamine so that the $F/NH_2$ ratio in this stage is between 0.5 and 0.9;

in a third stage, adding urea so that the $F/NH_2$ molar ratio of the resin is between 0.3 and 0.5, borax being optionally added at the end of condensation.

The following examples illustrate the present invention. The quantities are expressed in parts by weight.

EXAMPLE 1

The following are introduced into a reactor equipped with a condenser, a stirrer and a heating device:
1689 parts of a urea-formaldehyde precondensate containing 56.4% of formaldehyde and 23.6% of urea,
582 parts of urea,
529 parts of water.

The $F/NH_2$ molar ratio at this stage is 1.05. After this acidic condensation stage
464 parts of urea, and
240 parts of melamine
are added.

The $F/NH_2$ molar ratio at this stage is 0.62.

In the third stage, 4 parts of borax and 496 parts of urea are added. The final resin obtained exhibits the following characteristics:

| | |
|---|---|
| $F/NH_2 =$ | 0.47 |
| Viscosity at 20° C.: | 0.74 Pa s |
| Solids content: | 65.3% |
| pH: | 8.34 |
| Gel time at 100° C.: | 13 minutes. |

Catalytic solutions are prepared from formurea which has the following composition:

| | |
|---|---|
| urea | 20.13% by weight |
| formaldehyde | 49.02% |

Various ammonium salts are added. The following Table shows the quantities of reactants used.

| Ammonium salts | mass of salts or acid (g) | mass of water (g) | mass of formurea (g) |
|---|---|---|---|
| $NH_4^+$ formate | 42.3 | 125 | 200 |
| $NH_4^+$ acetate | 51.72 | 147.2 | 200 |
| $NH_4^+$ lactate | 71.87 | 195.8 | 200 |
| $NH_4^+$ phosphate | 77.16 | 77.16 | 200 |

Each catalytic solution has been prepared by heating the ammonium salt in formurea at 70° C. for one hour.

EXAMPLE 2

The various catalytic solutions are used for curing the resin described in Example 1 (6% of melamine) and another resin of the same type which contains only 3% of melamine. In each test 0.04 moles of catalyst are used per 100 grams of dry resin.

The following Table shows the gel times at 80° C. (minutes). It also shows, by way of comparison, the gel times of the same resins cured in a known manner with ammonium chloride.

TABLE

| | (minutes, seconds) | |
|---|---|---|
| Ammonium salts | resin with 3% of melamine | resin with 6% of melamine |
| $NH_4^+$ formate | 5' | 9' |
| $NH_4^+$ acetate | 11' | 16' |
| $NH_4^+$ lactate | 3'45" | 6'15" |
| $NH_4^+$ phosphate | 2'30" | 4' |
| $NH_4^+$ chloride | 2'15" | 6'30" |
| Control ($F/NH_2$ 0.477 $NH_4Cl$) | 13' | 19' |

EXAMPLE 3

The resin prepared in Example 1 is cured with the catalytic systems described in Example 1 with a view to preparing particle boards.

The Table shows the characteristics of the boards obtained and the characteristics of boards manufactured from a known resin which has a $F/NH_2$ ratio=0.535, containing 6% of melamine and cured in a known manner with the aid of an ammonium chloride solution.

The characteristics of the boards have been determined according to the following standards:

| | |
|---|---|
| Formaldehyde content (perforator) | in 120 |
| Thickness, density | NFB standard 51 222 |
| Tensile V 20 | NFB standard 51 250 |

| | resin 6% of melamine, F/NH$_2$ = 0.47 | | | | resin, 6% melamine F/NH$_2$ = 0.535 NH$_4$Cl catalyst |
|---|---|---|---|---|---|
| | triazinone acetate catalyst | triazinone formate catalyst | triazinone lactate catalyst | triazinone phosphate catalyst | |
| board thickness (mm) | 16.15 | 16.05 | 16 | 16 | 16 |
| Swelling 24 hours cold water | 15.8 | 13.4 | 14.2 | 12.3 | 13.7 |
| Perpendicular tensile (N/mm$^2$) for density (kg/m$^3$) | 0.59 655 | 0.64 674 | 0.67 680 | 0.70 677 | 0.70 690 |
| Flexure N/mm$^2$ for density kg/m$^3$ | 11.5 640 | 11 640 | 11 640 | 12.1 640 | 12 640 |
| Perforator formaldehyde mg/100g | 9.5 | 6.6 | 6.7 | 5.6 | 6.4 |

We claim:

1. In a process for curing liquid urea-formaldehyde resins containing essential amounts of melamine less than 10% by weight and having a F/NH$_2$ molar ratio of less than 0.5, the improvement which comprises adding to the melamine-containing aminoplastic resins a catalyst consisting essentially of a triazinone derivative of formula:

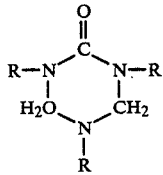

in which R is H and/or CH$_2$OH, this catalyst being employed in a proportion of 0.01 to 0.2 moles per 100 grams of dry resin.

2. A catalyst consisting essentially of a solution of a triazinone derivative of the formula

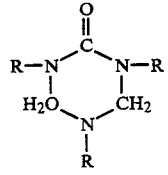

wherein R, being the same or different, is H or CH$_2$OH.

3. A catalyst according to claim 2, characterized in that it is obtained by reaction of urea and of formaldehyde or of a urea-formaldehyde precondensate with an ammonium salt, reactants being employed in the following molar ratios:

Formaldehyde/urea equal to at least 5 and Formaldehyde/(NH$_4$)$^+$ equal to at least 1 the salt being chosen from a chloride, an acetate, a lactate, a formate or a phosphate.

4. A catalyst according to claim 3, wherein the salt is ammonium phosphate.

5. A process according to claim 1, wherein the triazinone derivative is obtained by reaction of urea and of formaldehyde or of a urea-formaldehyde precondensate with an ammonium salt, the reactants being employed in the following molar ratios:

formaldehyde/urea equal to at least 5 and formaldehyde/(NH$_4$)$^+$ equal to at least 1, the salt being chosen from a chloride, an acetate, a lactate, a formate or a phosphate.

6. A process according to claim 5, wherein the salt is ammonium phosphate.

7. A process according to claim 1, wherein the amount of melamine is at least 3%.

8. A process according to claim 6, wherein the amount of melamine is 3–6%.

9. An aminoplast curing system according to claim 1.

10. An aminoplast curing system according to claim 8.

11. Particle board formed from wood chips and the aminoplast curing system of claim 9.

12. Particle board formed from wood chips and the aminoplast curing system of claim 10.

* * * * *